Figure 1:
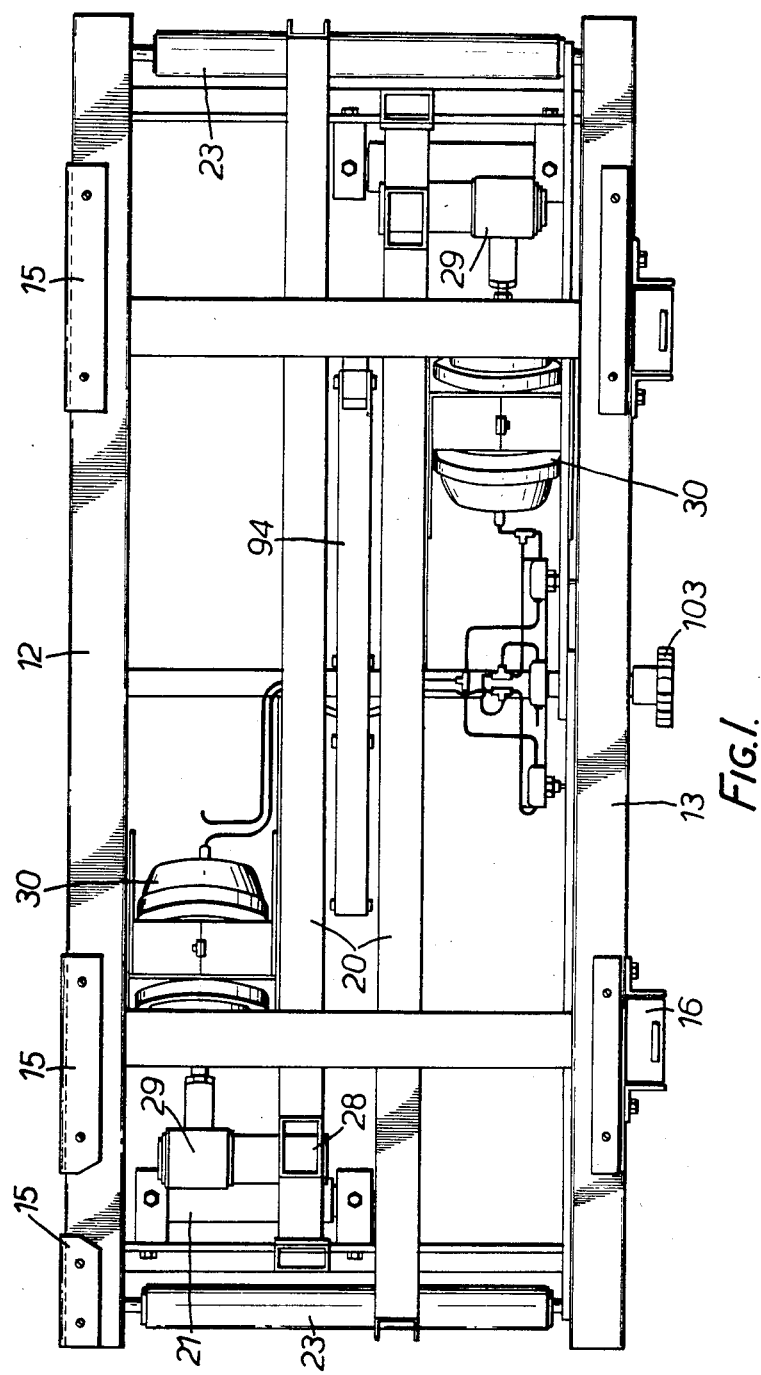

United States Patent [19]

Black et al.

[11] Patent Number: 4,541,134
[45] Date of Patent: Sep. 17, 1985

[54] VIBRATION DAMPING SUPPORTS

[75] Inventors: Joseph Black, Bath; Mark A. Foster, Amesbury; Nicholas G. Luard, Eastbourne, all of England

[73] Assignee: The University of Bath, Bath, England

[21] Appl. No.: 525,816

[22] Filed: Aug. 23, 1983

[30] Foreign Application Priority Data

Sep. 4, 1982 [GB] United Kingdom ............... 8225269
Jan. 13, 1983 [GB] United Kingdom ............... 8300850

[51] Int. Cl.$^4$ .............................................. A61G 1/06
[52] U.S. Cl. ............................................. 5/118; 5/62; 5/63; 248/588; 248/421; 296/20
[58] Field of Search .................... 5/118, 62–65; 296/19, 20; 248/584, 585, 588, 421

[56] References Cited

U.S. PATENT DOCUMENTS

| | | | |
|---|---|---|---|
| 1,875,500 | 9/1932 | Roeder | 248/585 |
| 2,747,919 | 5/1956 | Ferneau | 5/63 |
| 3,371,359 | 3/1968 | Dome | 5/118 |
| 3,752,526 | 8/1973 | Van Der Burgt | 296/19 |
| 3,760,436 | 9/1973 | Zach | 5/63 |
| 3,840,265 | 10/1974 | Stirling et al. | 5/62 |
| 4,078,269 | 3/1978 | Weipert | 5/118 |
| 4,144,601 | 3/1979 | Anderson et al. | 5/118 |
| 4,148,518 | 4/1979 | Vilbeuf | 248/585 |
| 4,194,716 | 3/1980 | Barecki et al. | 248/585 |
| 4,196,483 | 4/1980 | Lefler et al. | 5/118 |

FOREIGN PATENT DOCUMENTS

| | | | |
|---|---|---|---|
| 0005583 | 11/1979 | European Pat. Off. | 248/588 |
| 0021526 | 1/1981 | European Pat. Off. | 296/19 |

Primary Examiner—Gary L. Smith
Assistant Examiner—Michael F. Trettel
Attorney, Agent, or Firm—Young & Thompson

[57] ABSTRACT

This disclosure relates to vibration damping supports and in particular to a suspension unit for a stretcher.

The stretcher support unit comprises a rectangular base frame (10) on which is supported, by means of a resilient support mechanism, a stretcher frame or carrier (11). The support mechanism comprises a pair of cantilever arms (20) inclined upwards in opposite directions and each pivotally mounted at its lower end on the base frame (10). The movements of the cantilever arms (20) are controlled by respective gas-liquid suspension units (30), which are mounted between the base frame (10) and an extension arm (28) of each cantilever arm (20). The suspension units comprise, in one embodiment, a gas reservoir (70), a sealed liquid reservoir (71), a flexible diaphragm (72) forming one end of the liquid reservoir and an actuator piston (73). This construction serves to damp the movements of the cantilever arms (20) and hence the stretcher mounted on the carrier (11), and also enable the height of the carrier to be varied between a loading position and a position in which the stretcher rides.

4 Claims, 12 Drawing Figures

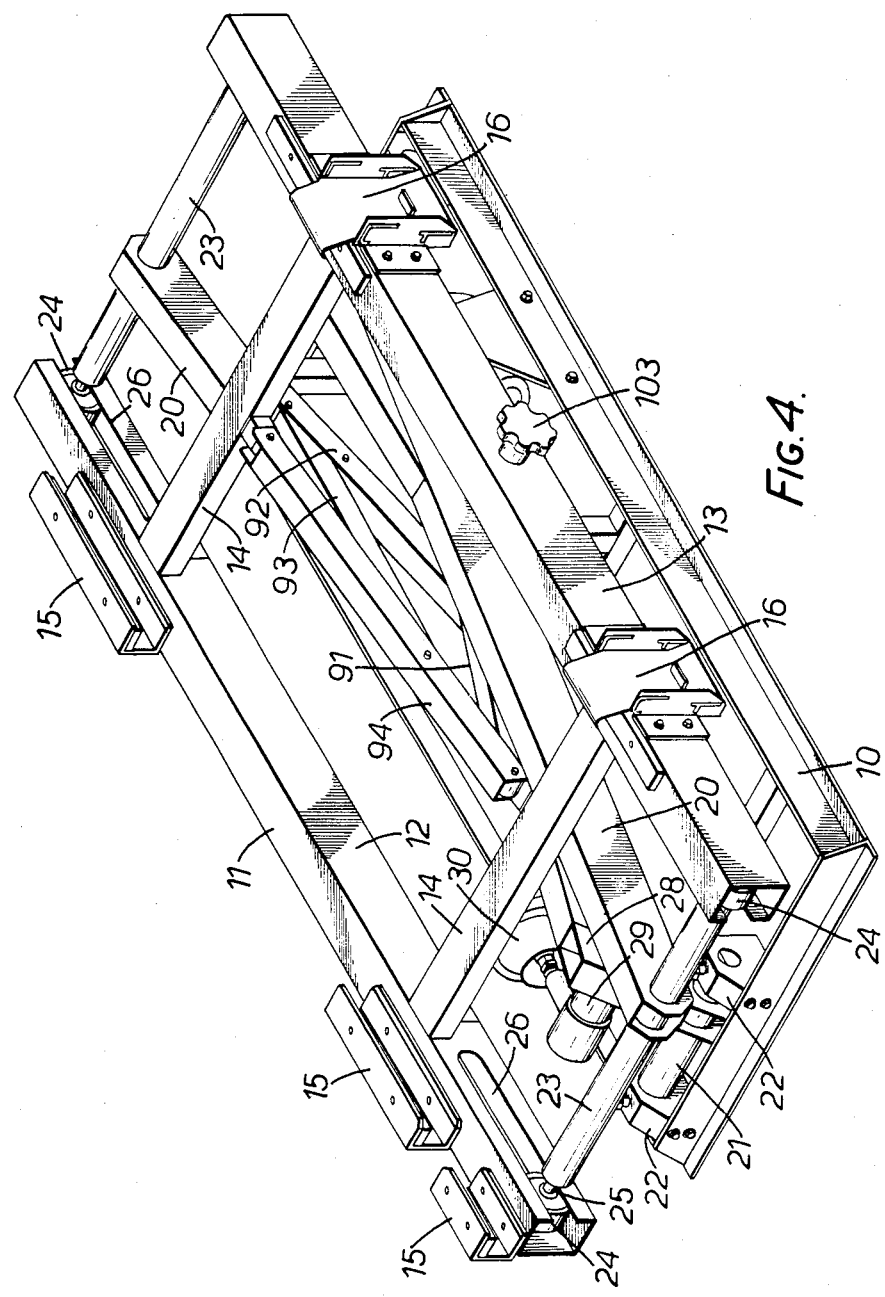

VIBRATION DAMPING SUPPORTS

This invention relates to a vibration damping support designed primarily for supporting human bodies or patients in moving vehicles and is particularly, though not exclusively, applicable to a support for a medical stretcher in an ambulance.

Tests have shown that the vibration imparted to a seriously injured person while travelling in an ambulance can have serious and even fatal results. The problem is made more difficult by the fact that whatever solution is adopted it must be compatible with ease of handling of the patient on a stretcher, speed and convenience of approach for the attendants, and also inevitably the cost of manufacture and installation, all of which are to an extent conflicting.

Attempts have been made to improve the basic suspension system of a vehicle such as an ambulance to improve the "ride" for a patient. This, however, is an extremely expensive approach and unattractive to main vehicle manufacturers on account of the very small number of ambulances produced. Another prior approach to the problem has been to provide a stretcher with a built-in suspension system to improve the ride when in position in an ambulance. This, however, suffers from many disadvantages: the stretcher is extremely heavy and expensive and difficult to move into and out of an ambulance, it is not readily compatible with other equipment provided in hospitals, and it is most inconvenient for attendants in the ambulance. Furthermore, each stretcher is extremely expensive and unless one of the special stretchers is provided in each ambulance the system cannot be generally available.

Now broadly stated the invention consists in apparatus for use in supporting a body or patient in a vehicle comprising an upper carrier mounted on a supporting mechanism which is capable of raising the carrier to a mean elevated height, at which the mechanism provides a resilient supporting force over a range of vertical movement while restraining horizontal movement in at least one direction.

As stated the apparatus is particularly useful for supporting a stretcher in an ambulance or other vehicle and preferably the supporting mechanism is mounted on a floor of the vehicle and has a maximum height in its collapsed condition of less than 0.5 meters .

According to a particular preferred feature of the invention the supporting mechanism is combined with a resilient support in the form of a positive displacement gas operated piston and cylinder, bellows or diaphagm unit. The mechanism preferably includes a resilient device whose "rate" is variable over the vertical travel of the mechanism and according to a particular preferred feature of the invention the rate of the mechanism is variable or adjustable, e.g. by substituting a different rate-changing element. The resilient support also preferably includes a liquid displacement system combined with a liquid restrictor to act as a damper on the movement of the structure.

In a particular preferred construction the elevating and resilient suspension is a pneumatic piston and cylinder unit and includes a pressurised gas supply reservoir with control valve mechanism for actuating the cylinder.

The apparatus also preferably includes means for locking the suspension at any required vertical height and it is of advantage that the apparatus should include means for adjusting the longitudinal or lateral inclination of the support. The apparatus may also include means for automatically adjusting the longitudinal or lateral inclination in accordance with the sensed movement of the vehicle.

According to a particular preferred feature of the invention the resilient and frictional damping characteristics of the system are such as to reduce by a factor of at least one half the amplitude of input vertical vibrations imparted to the body over a frequency range from 1 to 10 HZ, or from 2 to 4 HZ.

Figure 2:
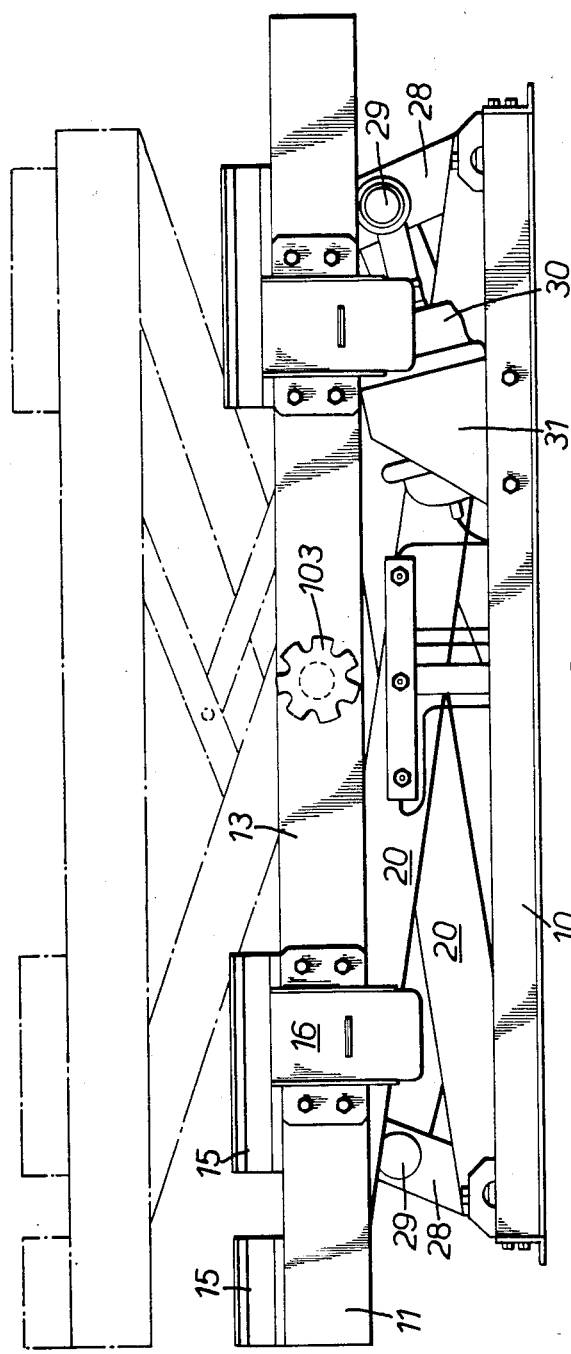
Figure 3:
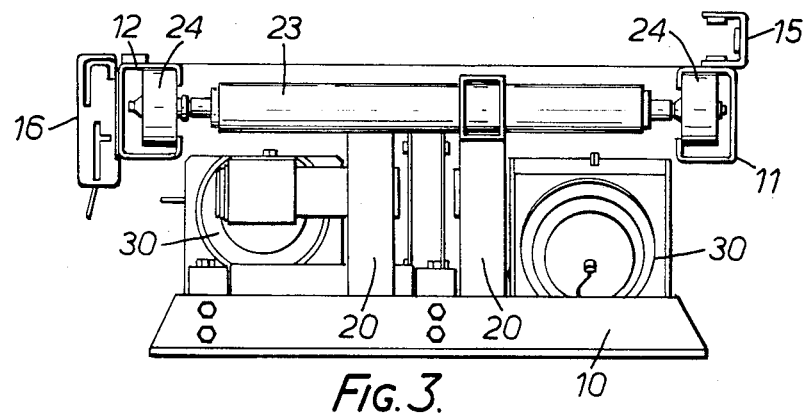
Figure 6:
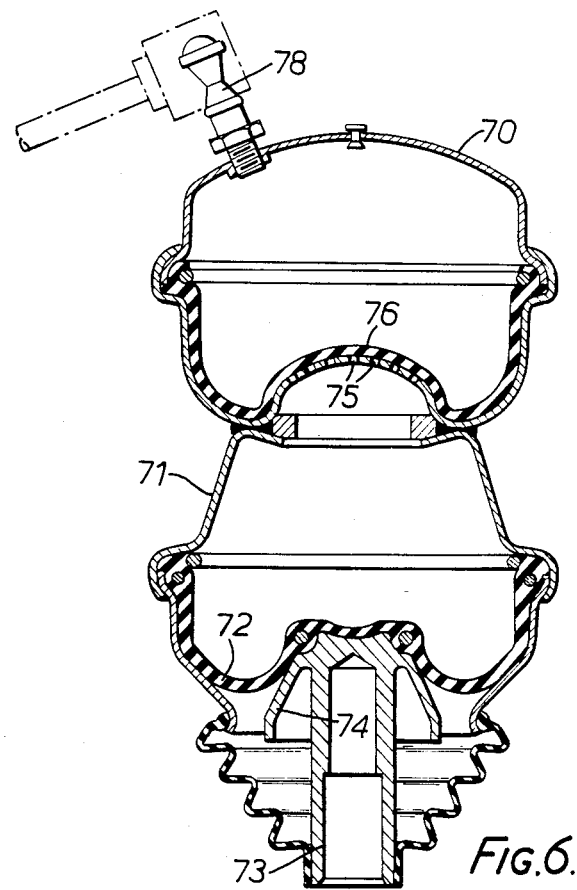
Figure 5:
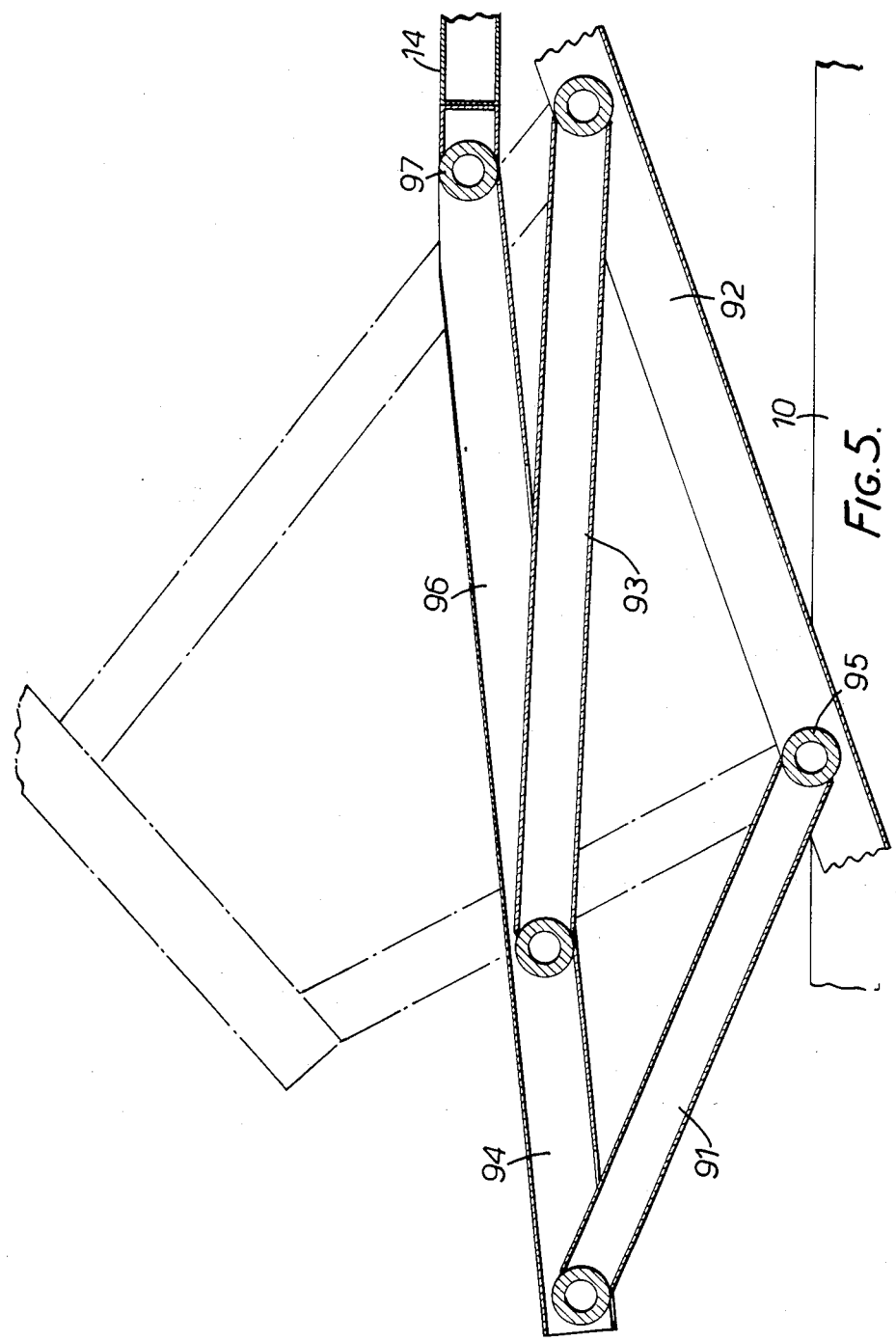
Figure 7:
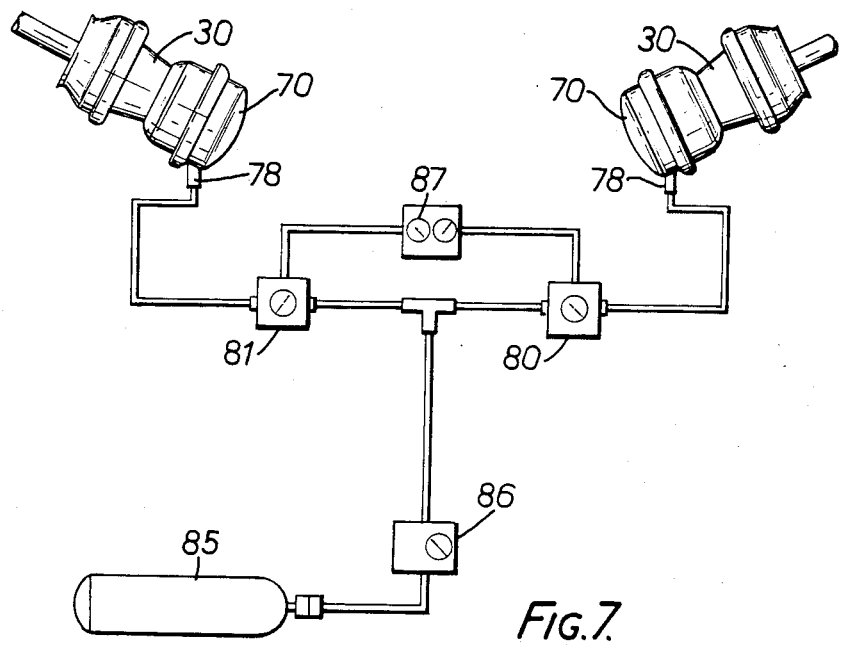
Figure 8:
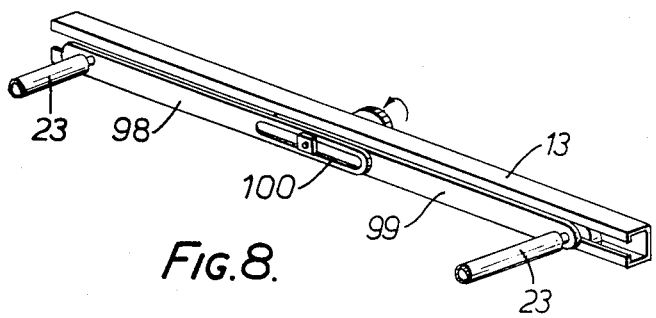
Figure 9:
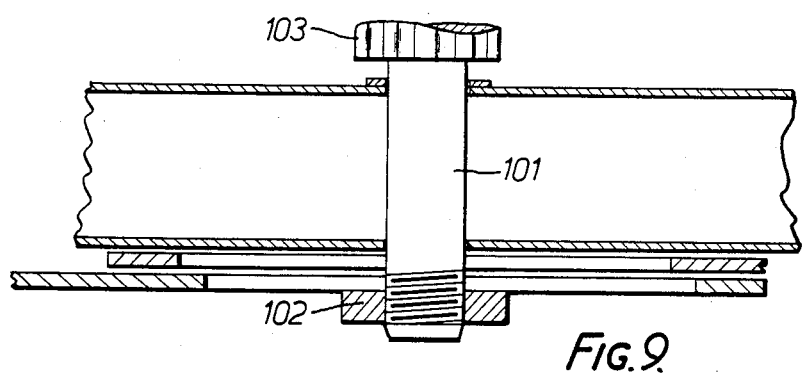
Figure 10:
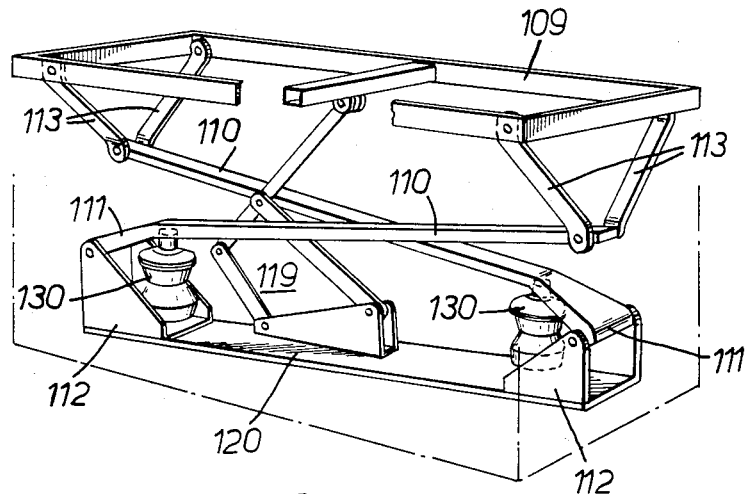
Figure 11:
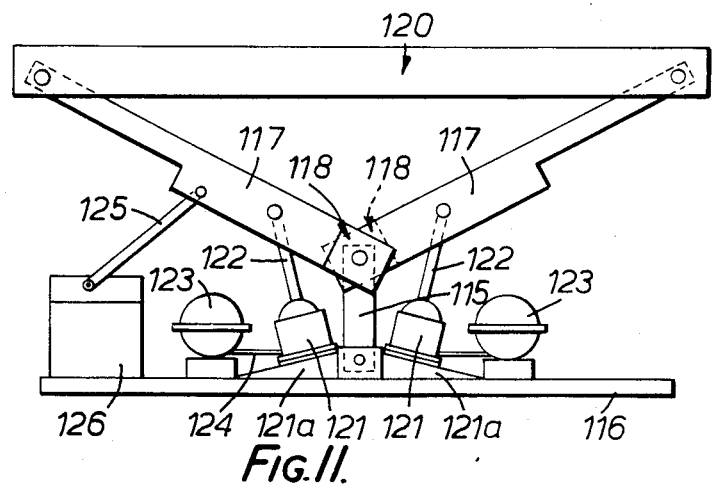
Figure 12:
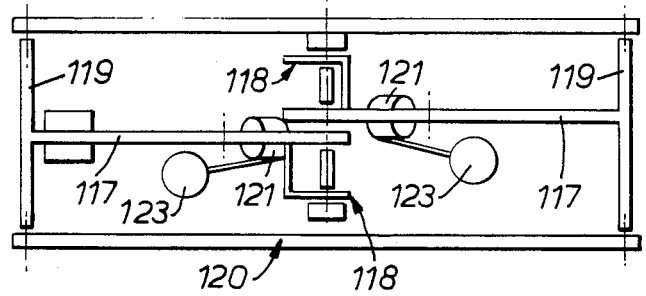

The invention may be performed in various ways and one specific embodiment with a number of possible modifications will now be described by way of example with reference to the accompanying drawings, in which:

FIG. 1 is a plan view of a stretcher support unit according to the invention for installation in an ambulance, FIG. 2 is a side elevation of the unit of FIG. 1, FIG. 3 is an end elevation illustrating two such units on the floor of an ambulance, FIG. 4 is a perspective view of one complete support unit, FIG. 5 is a diagrammatic side elevation illustrating the four-bar guide linkage, FIG. 6 is a diagrammatic sectional elevation through one of the gas-liquid suspension devices, FIG. 7 is a diagrammatic illustration of a pressurising system for adjusting the height of the structure, FIG. 8 is a perspective view of part of the carrier illustrating a height locking device, FIG. 9 is a detailed sectional plan view of the lock in FIG. 8, FIG. 10 is a perspective view of a modified form of supporting mechanism, FIG. 11 is a diagrammatic side view of another form of supporting mechanism, and FIG. 12 is a diagrammatic plan view from above of the mechanism of FIG. 10.

In this example the invention is applied to a suspension unit designed to be installed permanently and fixed on the floor of an ambulance, preferably on the floor alongside one of the longitudinal walls. There may be two such units one on each side with a gap between as seen in FIG. 3, and the units are so designed that a conventional wheel stretcher can be lifted into the ambulance by conventional movements and can then be pushed sideways on its castor wheels into position over the suspension unit. By adjusting the height of the suspension unit, as will be described, the whole stretcher with the patient in position is then raised slightly to a controlled mean height and the suspension unit then supports the weight of patient and stretcher and provides valuable damping characteristics.

It will be appreciated that standard wheeled stretchers can be used without adding to their weight and without extra expense. The existing stretchers, of course, are compatible with other existing equipment in hospitals and the system does not in any way add to the difficulties of ambulance men and stretcher bearers. Also, importantly, it avoids the heavy expense of designing and building a complete ambulance suspension system or modifying existing systems.

In the example illustrated the suspension unit comprises a rectangular base frame 10, which is designed to be bolted or otherwise rigidly fixed to the floor of the ambulance and an upper floating stretcher support frame or carrier 11 provided with means to grip parts of the stretcher itself. The two frames are interconnected by the support and guide mechanism, which will be described in detail below.

The floating support frame or carrier 11 comprises two longitudinal channel or box frame members 12,13 cross-connected by rigid struts 14, one channel 12 being provided with a series of spaced open brackets 15 to receive one of the conventional bars of a stretcher while the other frame member 13 is provided with a pair of manually operated toggle clamps 16, which can be swung up or down to grip the other bar of the stretcher, or to release it as required.

The resilient support mechanism comprises a pair of cantilever arms 20 inclined upwards in opposite directions, each pivotally mounted at its lower end on the base frame 10 at a bottom bearing trunnion 21 carried in a pair of trunnion blocks 22. The upper end of each cantilever arm 20 is connected to a crossbar 23, which carries a roller 24 at each end engaging respectively in one of the channels 12 or 13, the shaft 25 of the roller being movable in a slot 26 formed in the channel. Thus, the two cantilever arms 20 can pivot in unison or separately, the height and attitude of the floating frame 11 being determined by the combined and relative movements of the two arms. These movements are accompanied by longitudinal movements of the rollers 24 in the channels 12,13.

Each cantilever arm 20 is rigidly connected to or formed with an extension arm 28 having a projecting stub arm 29 connected to a gas-liquid suspension unit 30, which is rigidly mounted on a supporting bracket 31 secured to the base frame 10. As seen in FIG. 2 the thrust of the unit 30 acts on the extension 28 as a bellcrank lever connected to the respective cantilever arm 20 in a direction to apply an upward supporting force to the floating frame 11.

One of the gas-liquid suspension units is illustrated diagrammatically in FIG. 6. It comprises a gas reservoir 70, a sealed liquid reservoir 71, a flexible diaphragm 72 forming one end of the liquid reservoir, and an actuator piston 73 provided with a specially shaped cone 74 with a skirt which progressively engages the diaphragm as the piston rod moves in and out of the liquid reservoir. In addition, there is a restrictor or damping element 75 with small apertures designed to restrict the flow of liquid, and a separator diaphragm 76 adjacent the damping restrictor. The gas reservoir 70 is provided with an external filling or pressurising adaptor 78.

In operation, assuming that the gas and liquid reservoirs 70,71 are both initially full, it will be seen that movement of the piston 73 into the liquid reservoir causes the diaphragm 72 to deflect and to roll over the skirt of the cone 74 and liquid is displaced accordingly through the damping restrictor 75 thus shifting the diaphragm 76 away from the restrictor so that the gas in reservoir 70 is compressed. This provides a resilient restoring force with a rate which is determined by the dimensions of the parts and by the profile of the cone skirt 74. The characteristics can also be varied by admitting or withdrawing gas from the reservoir 70 as will be explained.

FIG. 7 illustrates diagrammatically a fluid circuit for adjusting the gas-liquid suspension units. The gas reservoirs of the two units 30 are each connected from their adaptors 78 to a respective pressure control valve 80,81 in turn connected to a high pressure gas bottle 85 via a pressure reducing valve 86. The two individual pressure control valves 80,81 may be adjusted independently and manually, or in unison through a linked control 87.

By this control system it is possible to admit gas at a controlled lower pressure to the two gas reservoirs 70 from the pressurised gas in the bottle 85. This causes the upper stretcher frame 11 to rise carrying the stretcher and patient, and by adjusting the valves 80,81 the stretcher can be set at any required mean height and at any required angle of inclination. The adjustment provides automatic setting of the mean height to correspond with the weight of each patient, which is important in establishing the proper mean position for the suspension units. The required damping properties and the optimum frequency damping range is determined by the dimensions of the unit, by the viscosity of the liquid, and the size of the restrictor perforations at 75, and also by the effective ratio of the two cantilever arms 20 and the filling pressure of the units. In some applications satisfactory support and damping may be achieved by use of gas in both reservoirs 70 and 71, combined with friction in the bearings and other parts of the mechanism.

In the equipment as described, the upper floating stretcher frame 11 is free to float longitudinally on the four rollers 24, and is also free to float vertically under the influence of the suspension units. In some conditions, however, it is important that the stretcher should be fixed and locked, for example while medical personnel administer treatment to a patient. For this purpose, the suspension system includes a height locking mechanism, as illustrated in FIGS. 8 and 9. As illustrated, the two crossbars 23 carrying the rollers 24, are respectively connected each to one of a pair of slide bars 98,99 which lie parallel with the respective frame bar 13. Each slide bar has an elongated aperture 100 and the two apertures normally overlap and are transfixed by a bolt 101 having a threaded end with a clamping nut and washer 102 and an adjusting knob 103 accessible at the front of the assembly. Thus, by tightening the knob 103, the two slide bars are clamped together frictionally so fixing the displacement between the crossbars 23 and thereby fixing the height of the floating frame. This method of fixing the height of the frame temporarily offers several advantages, avoids overstressing any parts of the suspension and is simple and extremely rapid to operate.

The choice of a gas-liquid suspension system with the ability for independent adjustment of the pressure in each unit is most valuable in adjusting the system rapidly to the weight of individual patients and to different road conditions. For high-speed travel or over very bad surfaces, it may be necessary to set the mean support height at a different level.

It will be appreciated that the unit may also be provided with one or more suspension systems to control its attitude in a transverse or other direction. This would offer the ability to incline the floating stretcher frame laterally, for example, to compensate for rapid cornering or tilting of the vehicle. The invention may also include automatic control devices for adjusting the height of the individual gas-liquid suspension units to produce the required height and attitude control. A universal inertia valve may be connected to three such suspension units to provide a universal three-dimensional tilt control on the floating frame.

Since the floating frame is effectively free to slide longitudinally on the four rollers 24, a vertical guide mechanism is provided to restrain the frame against longitudinal movement while permitting free vertical float. The vertical guide system is illustrated in FIG. 5 and comprises four links 91, 92,93,94, the two lower links being pivotally mounted at 95 on the bottom frame 10, while the upper link 94 has an extension 96 with a pivot 97 attached to one of the cross struts 14 of the floating frame. The design and dimensioning of the unit is such that the upper pivot 95 moves approximately in a vertical line thus restraining the whole floating frame from lengthwise movement.

In the example illustrated the two cantilever arms 20 are pivotally mounted at their lower ends on the bearing trunnions 21,22. Other forms of mounting may be used and a particularly advantageous arrangement is the use of a bonded rubber mounting bush, which has the combined effect of eliminating normal friction, providing an additional damping effect for certain frequencies, and also applying an additional resilient reaction to supplement the support provided by the gas-liquid units. Bonded rubber bushes may also be used at other pivotal joints in the system, particularly the pivots 29 for the gas-liquid units, the pivots at the upper ends of the cantilever arms 20, and the pivots of the four bar linkage illustrated in FIG. 5.

In the examples described the gas "springs" comprising the gas reservoirs 70 combined with liquid reservoir 71, are adjusted and controlled by introducing or withdrawing gas from the gas reservoirs. In a possible modification the gas reservoirs may be sealed and the characteristics of the units varied by introducing or withdrawing further liquid from the liquid reservoirs.

The modified mechanical support system illustrated in FIG. 10 is in some respects similar to that described above. There are two main inclined suspension arms 110 each hinged at 111 to a pair of brackets 112. fixed on the base frame 120, Each of these support arms is associated with a resilient gas liquid suspension unit 130 of the type described above and it will be seen that each of these units acts directly between the base of the bracket 112 and a point on the respective arm 110 close to the pivot axis 111. This provides the required mechanical advantage and avoids the need for bell crank levers and other complications. The free end of each of the arms 110 is connected to a pair of pivoted links 113, which are themselves pivotally attached to the floating support frame 109 of the stretcher.

The mechanism also includes a four-bar linkage indicated generally at 119 arranged to permit free vertical movement and to restrain endwise movement in the manner described previously.

FIGS. 11 and 12 show a further modification of the mechanism. In this embodiment an upright support 115 is mounted centrally on a base 116 and has arms 117 pivoted, by means of forks 118, at its free end. The arms 117 extend upwardly to cross-members 119, which are connected to the frame 120.

Respective suspension units 121 are mounted on either side of the pivot 115 on inclined bases 121a, with the free end of their piston rods 122 pivotally connected to a respective arm 117. The suspension units 120 are constructed in much the same manner as the units 30, except that the gas reservoirs 70 and part of the liquid reservoir 71 are incorporated into external tanks 123, which are connected to the main unit 120 by a pipe 124. This arrangement is necessary in order to reduce the height of the suspension units. A link 125 extends from one arm 117 to a frame 126 mounted on the base 116 to restrain horizontal movement of the mechanism. In this respect it replaces the four bar linkage 119.

Although the use of the gas liquid suspension units is maintained in this embodiment, it is envisaged that, in at least certain circumstances, a pure pneumatic piston cylinder arrangement may be used; the damping being provided simply by the compression and expansion of the gas in the cylinder.

We claim:

1. Apparatus for use in supporting a patient on a stretcher in a vehicle, comprising a base support, an upper carrier for the stretcher, at least two support arms pivotally mounted on the base support and connected to the upper carrier at horizontally displaced positions, means for restraining horizontal movements of the carrier in a direction perpendicular to the pivot axes of the support arms, and means for exerting a resilient upward force on each support arm including a movable piston connected to a point on the arm displaced from the pivot axis, a pneumatic chamber acting as a gas spring, a sealed hydraulic system including a first diaphragm engaged by the piston and a second diaphragm providing a movable interface with the gas in the pneumatic chamber, and including means for independently pressurising the two pneumatic chambers to raise, lower or tilt the carrier, the sealed hydraulic system including restrainer means damping the flow of hydraulic fluid between the piston cylinder and the pneumatic chamber.

2. Apparatus according to claim 1, in which the means restraining horizontal movement of the carrier comprises a four bar linkage coupled between the carrier and the base support.

3. Apparatus according to claim 1, in which the effective rate of the gas spring provided by the pneumatic chamber varies automatically over the vertical travel of the carrier.

4. Apparatus according to claim 1, including a pressurised gas container associated with a valve controlling the supply of gas to each of the two pneumatic chambers.

* * * * *